United States Patent
Scheffler

(10) Patent No.: US 8,687,695 B2
(45) Date of Patent: Apr. 1, 2014

(54) APPARATUS AND METHOD OF DETERMINING MOTION VECTORS ASSIGNED TO IMAGE REGIONS

(75) Inventor: Guenter Scheffler, Munich (DE)

(73) Assignee: Entropic Communications, Inc., San Diego, CA (US)

( * ) Notice: Subject to any disclaimer, the term of this patent is extended or adjusted under 35 U.S.C. 154(b) by 2428 days.

(21) Appl. No.: 11/142,830

(22) Filed: Jun. 1, 2005

(65) Prior Publication Data

US 2005/0265456 A1  Dec. 1, 2005

(30) Foreign Application Priority Data

Jun. 1, 2004 (DE) .......................... 10 2004 026 597

(51) Int. Cl.
*H04N 7/12* (2006.01)

(52) U.S. Cl.
USPC ..................................... 375/240.16

(58) Field of Classification Search
USPC ............ 375/240.01, 240.15, 240.16, 240.24, 375/240.26
IPC ....................................................... H04N 7/12
See application file for complete search history.

(56) References Cited

U.S. PATENT DOCUMENTS

| | | | | |
|---|---|---|---|---|
| 5,148,269 A | | 9/1992 | De Haan et al. | 358/105 |
| 5,557,341 A | | 9/1996 | Weiss et al. | |
| 5,661,524 A | * | 8/1997 | Murdock et al. | 375/240.15 |
| 5,790,207 A | | 8/1998 | Jung | |

FOREIGN PATENT DOCUMENTS

EP  0466981 B1  2/1997

OTHER PUBLICATIONS

Alparone et al. "Adaptively Weighted Vector-Median Filters for Motion-Fields Smoothing", 1996 IEEE International Conference on Acoustics, Speech, and Signal Proceedings, Atlanta, May 7-10, 1996, vol. 4, Conf. 21, pp. 2267-2270, XP000681684.
Schröder et al. "Multidimensional Signal Processing", vol. 2, ISBN: 3-519-06197-X, p. 259-266.

* cited by examiner

*Primary Examiner* — Young Lee
(74) *Attorney, Agent, or Firm* — Bruce Greenhaus; Richard Bachand; Duane Morris LLP

(57) ABSTRACT

An image includes a plurality of image blocks each including a plurality of pixels and having an associated motion vector. The image is processed by selecting an image block and a corner region (E1x) located in a corner of the selected image block to provide a selected corner region. A plurality of adjacent image blocks located adjacent to the selected corner region are then selected from the plurality of image blocks. The motion vectors assigned to the adjacent image blocks are then compared to determine if the motion vectors form a homogeneous vector field. When the motion vectors of the adjacent image blocks form a homogeneous vector field, a motion vector for the corner region is generated from the motion vectors of the adjacent image blocks. When the motion vectors of the adjacent image blocks do not form a homogeneous vector field, the motion vector for the corner region is set equal to the motion vector of the image block.

14 Claims, 4 Drawing Sheets

APPARATUS AND METHOD OF DETERMINING MOTION VECTORS ASSIGNED TO IMAGE REGIONS

PRIORITY INFORMATION

This application claims priority from German patent application DE 10 2004 026 597.6 filed Jun. 1, 2004, which is hereby incorporated by reference.

BACKGROUND OF THE INVENTION

The invention relates to the field of image processing, and in particular to determining motion vectors which are individually assigned to image regions of an image.

In image processing, a known approach is to assign motion vectors to individual image regions of an image which is part of a sequence of images. These motion vectors each indicate a displacement of the position of this image region relative to a position for this image region in a previous or following image of the image sequence. The thus obtained motion information is useful, for example, in generating one or more intermediate images lying chronologically between the images of the image sequence in order to correctly display the position of moving objects in the intermediate images (i.e., displaying them with correct motion). The motion information for an object moving over multiple successive images may also be employed for the compressed storage of image data for successive images.

One possible method, among many others, for generating these motion vectors is the block matching method which is described, for example, in Schröder, H.; Blume, H.: *Mehrdimensionale Signalverarbeitung* ["Multidimensional Signal Processing"], Volume 2, ISBN 3-519-06197-X, pages 259-266. In this method, the current image from an image sequence is subdivided into a number of blocks of equal size. For each of these blocks, a block is sought in the previous or following image, the content of which has the greatest agreement with the specific block of the current image. The displacement vector between this block from the current image and the block from the previous or following image which has the greatest number of agreements with this block of the current image then forms the motion vector for this block of the current image.

In the so-called full search algorithm, each block of the current image is compared with each block of the previous or following image in order to determine the motion vectors of the individual regions. To reduce the considerable computational effort required for the full search algorithm, additional predictive estimation techniques are known in which motion information from prior motion estimates is utilized when determining the motion vector for a specific block.

The quality of the motion estimate using the block estimation technique is significantly dependent on the block resolution (i.e., the size of the individual blocks). The quality increases as the size of the individual blocks decreases, in other words, as the resolution of the image in the individual blocks becomes better, and thus more motion vectors per image are determined. At the same time, however, the computational effort also rises with increasingly small block sizes. The susceptibility to errors also grows with increasingly small block sizes. The optimum block size is thus approximately 4×8 (lines×pixels). However, with blocks of this size clearly noticeable block structures are created during image processing. For example, when a round object moves in the image in front of a background, the block estimation can result in noticeable edges at the border of the object relative to the background.

An approach to increasing the resolution for the determination of motion vectors is known from U.S. Pat. No. 5,148,269, whereby the image is subdivided into a predetermined number of main blocks and a block estimate is first implemented in order to assign a motion vector to each of these main blocks. Each of the individual main blocks is then subdivided into a number of sub-blocks to which one motion vector each is assigned. The motion vector of the associated main block, and motion vectors of additional main blocks adjacent to the main block, are utilized to generate the motion vectors of the sub-blocks.

There is a need for a technique of determining motion vectors which offers increased resolution together with an acceptable increase in the expenditure of computing capacity, and which is in particular capable of avoiding block-like structures in an image generated using motion vectors.

SUMMARY OF THE INVENTION

An image is subdivided into a number of rectangular image blocks, and a motion vector is determined for each of these image blocks. Starting with this subdivision of the image into these rectangular image blocks and the assignment of motion vectors to the individual image blocks, the method includes defining a corner region located in a corner of one of the image blocks. The image blocks adjacent to this corner region are then determined, and it is then determined whether the motion vectors assigned to these adjacent image blocks form a homogeneous vector field. A motion vector is then generated for the corner region from the motion vectors of the adjacent image blocks when the motion vectors of the adjacent image blocks form a homogeneous vector field.

This method is based on the assumption that whenever the motion vectors of the image blocks which are adjacent to a corner of an examined image block form a homogeneous vector field, at least the motion vector of this corner region also belongs to this homogeneous vector field, such that this motion vector of the corner region is generated from the motion vectors of these adjacent image regions. In particular, given the homogeneity of the motion vectors of the adjacent image blocks, only these motion vectors of the adjacent image blocks are utilized to generate the motion vectors of the corner region.

In one embodiment, generation of a motion vector for the corner region comprises an averaging of the motion vectors of the adjacent image blocks. The motion vectors of the adjacent image blocks can receive the same weighting during averaging. Alternatively, it is also possible to give weightings of varying degrees to the motion vectors adjacent to the corner region. Preferably, stronger weight is given to the motion vector of the image block that is adjacent to the corner region at only one corner, in other words, which adjoins the examined image block in a diagonal direction.

As long as the motion vectors do not form a homogeneous vector field relative to the corner region, in one embodiment of the method the motion vector of the examined image block is assigned as the motion vector to the corner region. In this case, the method has no effect on the motion vector of the corner region.

The definition of the corner region can be implemented by various approaches. The number and arrangement of the pixels of an examined image block forming this corner region are specifically a function of the number of pixels which the image block comprises.

In one embodiment, the corner region comprises only one corner pixel located in the one examined corner of the image block. In another embodiment, the corner region comprises, starting from the corner pixel, at least one pixel adjacent in the horizontal direction of the image block to the corner pixel, and at least one pixel adjacent in the vertical direction of the image block to the corner pixel.

Corner regions are preferably defined for all the corners of the one image block, then one motion vector is generated as explained above for each of these corner regions. The individual corner regions are preferably defined such that the corner regions of the adjacent corners adjoin each other.

In another embodiment, after definition of corner regions of an examined image block and generation of motion vectors for these corner regions, the additional step is taken of defining a center region located in the center of the examined image block in order to determine whether the motion vectors of at least five image blocks adjacent to the examined image block form a homogeneous vector field, then generating a motion vector for this center region from the motion vectors of the at least five adjacent image blocks if the motion vectors of these at least five adjacent image blocks form a homogeneous vector field.

The presence of a homogeneous vector field is assumed, both for the generation of a motion vector for a corner region and for the generation of a motion vector for a center region, if the values of the difference vector which are formed from the vector difference of the motion vectors for the adjacent image blocks are smaller than a predetermined threshold value.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
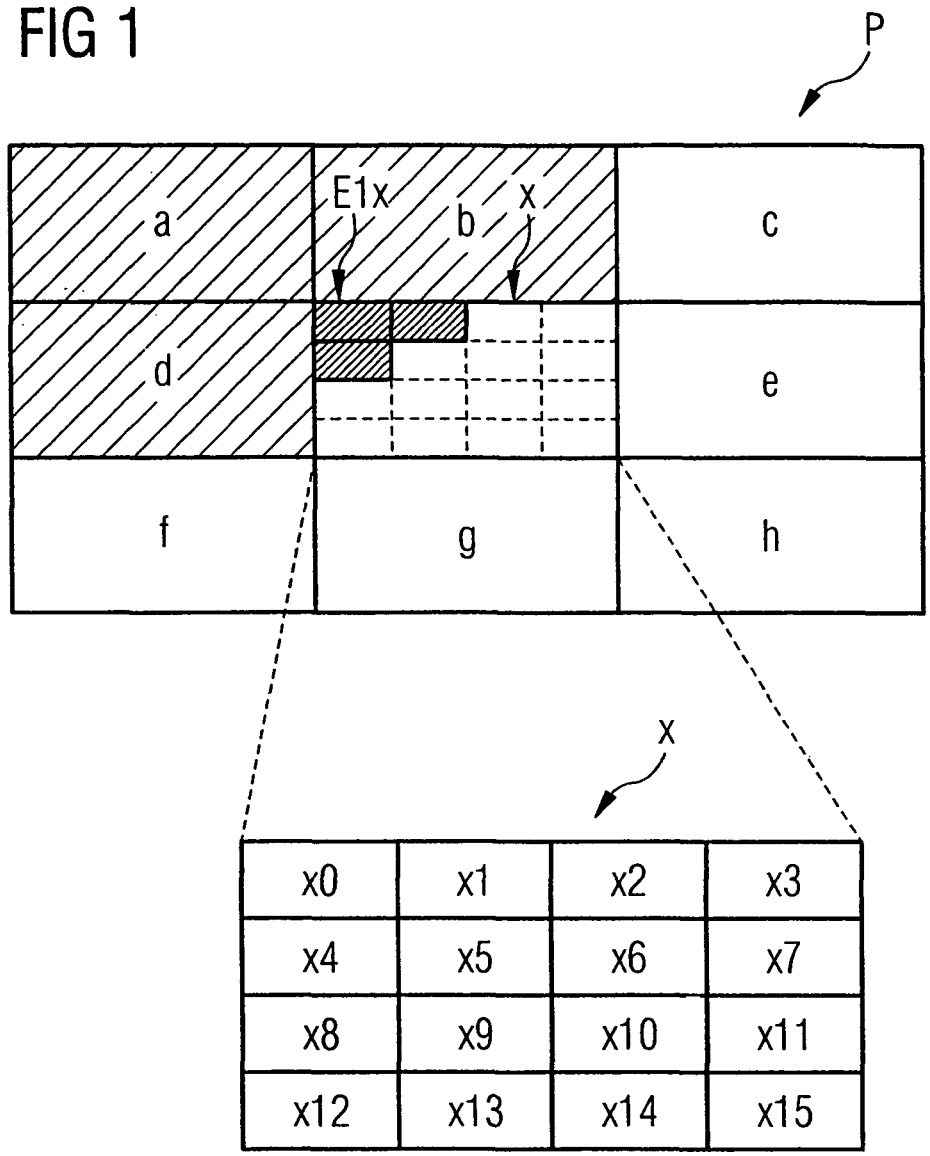
FIG. 1 illustrates an image section with multiple adjacent image blocks, where a motion vector is generated for a first corner region of an examined image block.

FIG. 1 illustrates a section of an image P from an image sequence, where the image sequence comprises a number of chronologically sequential images (not shown) of similar structure. Image P is, for example, an image from a sequence of television or video images.

The image is subdivided into equal-sized rectangular image blocks a-h, x, of which nine image blocks are shown in the section of FIG. 1. Of the image blocks shown, a-h, x, three are located horizontally adjacent to each other, and three are located vertically adjacent to each other.

A motion vector is assigned to each of these image blocks a-h, x. The estimation of these motion vectors for the individual image blocks can be implemented by conventional, sufficiently well-known block estimation methods, such as, for example, those described in Schröder, H.; Blume, H.; loc. cit., pages 259 et seq.

A method according to an aspect of the invention is based on a subdivision of the image P into individual image blocks to which one motion vector each is assigned.

Of the image blocks a-h, x shown in FIG. 1, image block x, to which the remaining image blocks shown in FIG. 1 are adjacent, will be examined in more detail below. Without limitation to the general applicability, the following explanation presumes that the image blocks comprise 16 pixels which are arranged in a pixel matrix having four lines of four pixels each. For purposes of the following explanation, these 4×4 pixels are numbered consecutively from x0 through x15, as is shown in the section of image block x enlarged in FIG. 1.

With reference to FIG. 1, in the method according to the invention a corner region E1x is defined within the examined image block x in one corner—in the upper left corner of image block x in this example. In the embodiment, this corner region comprises the corner pixel x0 located in the upper left corner, the pixel x1 located horizontally next to this corner pixel, and the pixel x4 located vertically adjacent to corner pixel x0. In FIG. 1, the corner region E1x is shaded. Adjacent to this corner region E1x are image blocks a, b, d, i.e., the image block b located vertically above examined image block x, the image block d located horizontally to the left of examined image block x, and the image block a located diagonally to the left above examined image block x.

In order to generate a motion vector V1x for the corner region E1x, the first step is to examine whether motion vectors Va, Vb, Vd of image blocks a, b, d adjacent to corner region E1x form a homogenous vector field. Such a vector field is present if the absolute values of the difference vectors which are formed by two each of these motion vectors Va, Vb, Vd are smaller than a predetermined threshold value. A homogeneous vector field is thus present when:

$$|Va-Vb|<\Delta_{max} \quad (1a)$$

$$|Va-Vd|<\Delta_{max} \quad (1b)$$

$$|Vb-Vd|<\Delta_{max} \quad (1c)$$

The term |.| represents the absolute values of the individual difference vectors, where the difference vectors are generated in the sufficiently well-known manner by forming the difference of the vector components.

The threshold value $\Delta_{max}$ can be a fixed predetermined value, or it can be determined as a function of the absolute values of the motion vectors. It is thus possible to determine the absolute values of examined motion vectors Va, Vb, Vd, take the average of these values, then select threshold value $\Delta_{max}$ such that it is smaller than a predetermined fraction, for example, 10% of this average value.

In a simplified embodiment, the presence of a homogeneous vector field can be assumed if only two of the above indicated relationships (1a)-(1c) are fulfilled.

Once this homogeneity is determined for motion vectors Va, Vb, Vd of image blocks a, b, d adjacent to corner region E1x, motion vector V1x of the corner region E1x is determined from the motion vectors Va, Vb, Vd of the adjacent image blocks a, b, d.

The motion vector V1x of the corner region E1x is thus a function of the motion vectors Va, Vb, Vd of the adjacent image blocks a, b, d, that is:

$$Vx=f(Va,Vb,Vd) \quad (2)$$

The function f(.) is, for example, a linear averaging, where:

$$V1x=k1 \cdot Va+k2 \cdot Vb+k3 \cdot Vd \quad (3).$$

For weighting factors k1, k2, k3, the applicable relation is:

$$k1+k2+k3=1 \quad (4).$$

The motion vectors of the image blocks adjacent to corner region E1x here may, specifically, be given equal weighting, such that k1=k2=k3=⅓.

In addition, it is possible to weight the motion vectors of the adjacent image blocks differently, whereby, in particular, the motion vector Va of the image block a located diagonally to the left above the examined corner region E1x is given a higher weight than the motion vectors of the two other adjacent image blocks b, d. In this case: k1>k2, k3.

An aspect of this method is the fact that, in the presence of a homogeneous motion vector field adjacent to the corner region E1x, the motion vector V1x of the corner region E1x is determined only from the motion vectors of the adjacent image blocks. Given the presence of this homogeneous vector field, the motion vector Vx assigned to the image block x is ignored for the determination of the motion vector V1x of the corner region E1x.

It is assumed that when the motion vectors Va, Vb, Vd of the image blocks a, b, d adjacent to the corner region E1x form a homogeneous vector field, the motion vector of the corner region E1x also belongs to this homogeneous vector field, such that this motion vector is formed from the motion vectors of the adjacent image blocks. Whenever the motion vector Vx assigned to the image block x is also part of this homogeneous vector field, the method according to an aspect of the invention assigns a motion vector to the corner region E1x, which vector differs little if at all from the motion vector Vx assigned to the image block x. However, if the motion vector Vx of the image block x is different from the motion vectors of the homogeneous vector field, then a motion vector different from this motion vector Vx assigned to the image block x is assigned to the corner region E1x. As a result, unwanted block-like structures can be avoided in the image generated using these motion vectors, which structures may be present when simply using the motion vector assigned to the individual blocks.

Figure 2A:
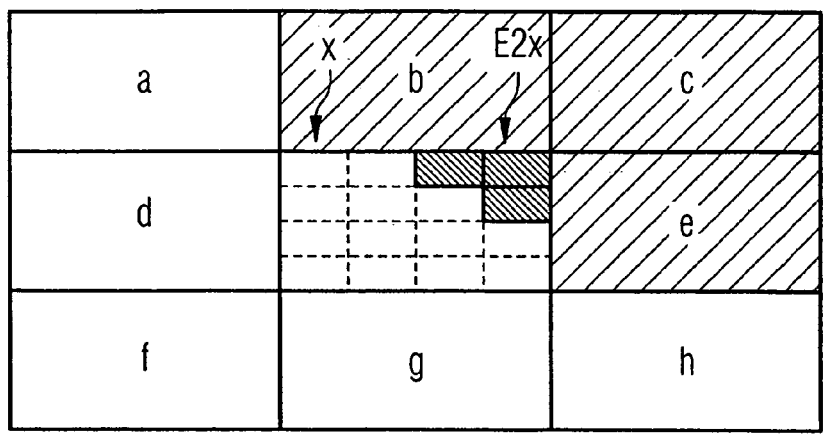
FIGS. 2A-2C illustrate the image section of FIG. 1 to explain the generation of motion vectors for additional corner regions of the examined image block.

A method according to the invention is preferably implemented for the corner regions in all four corners of the image block x. With reference to FIG. 2A and the enlarged section of FIG. 1, a second corner region E2x in an upper right corner of the image block x is formed by the three pixels x2, x3, x7 located in this corner. Adjacent to this second corner region E2x are image blocks b, c, e, the motion vectors Vb, Vc, Ve of which are examined and used to generate a motion vector V2x of the corner region E2x, in the manner explained above, when these motion vectors Vb, Vc, Ve form a homogeneous vector field.

Figure 2B:
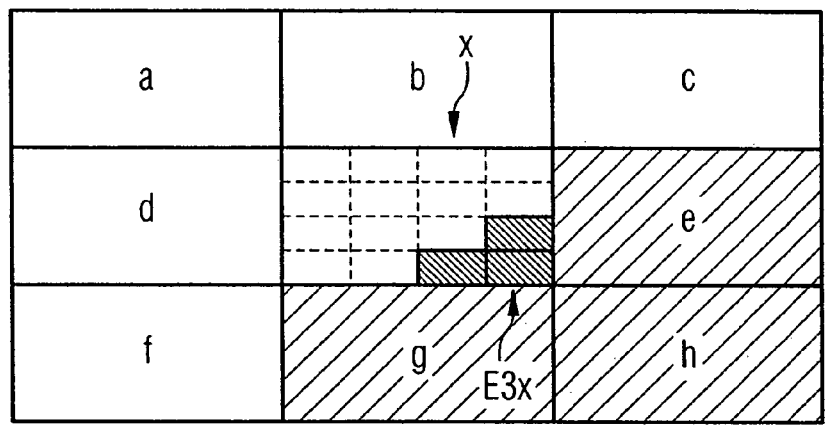

With reference to FIG. 2B and the enlarged section in FIG. 1, a third corner region E3x in the lower right corner of the image block x is formed by the pixels x11, x14, x15 located in this corner. Adjacent to this third corner region E3x are image blocks e, g, h, the motion vectors Ve, Vg, Vh of which are utilized to generate a motion vector V3x of this third corner region E3x whenever these motion vectors Ve, Vg, Vh form a homogeneous vector field, as specified in the above explanations.

Figure 2C:
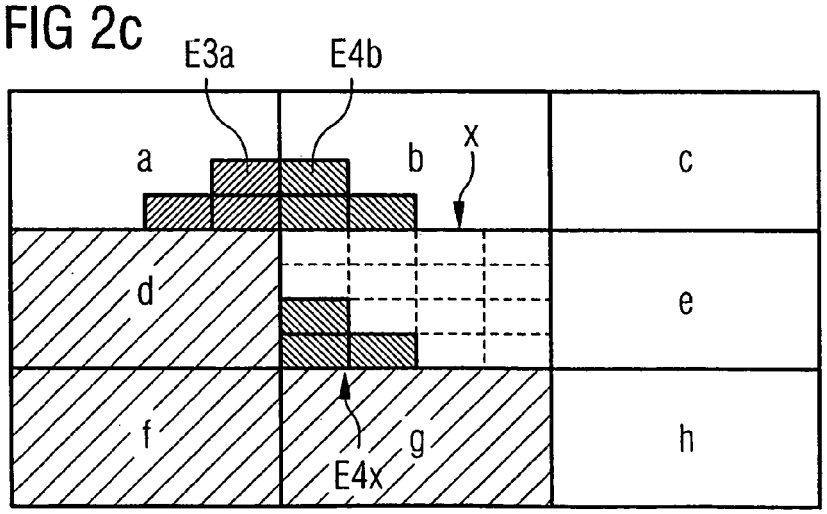

With reference to FIG. 2C and the enlarged section in FIG. 1, a fourth corner region E4x in a lower left corner of the image block x is formed by the pixels x8, x12, x13 located in this corner. When generating a motion vector V4x for this corner region E4x, motion vectors Vd, Vf, Vg of image blocks d, f, g adjacent to this corner region E4x are utilized whenever these motion vectors Vd, Vf, Vg form a homogeneous vector field.

If it is determined that a homogeneous vector field is not formed by the motion vectors of the image blocks adjacent to a corner region, the motion vector Vx of the examined image block x is assigned to the relevant corner region as the motion vector, i.e., this motion vector Vx is retained.

Figure 3:
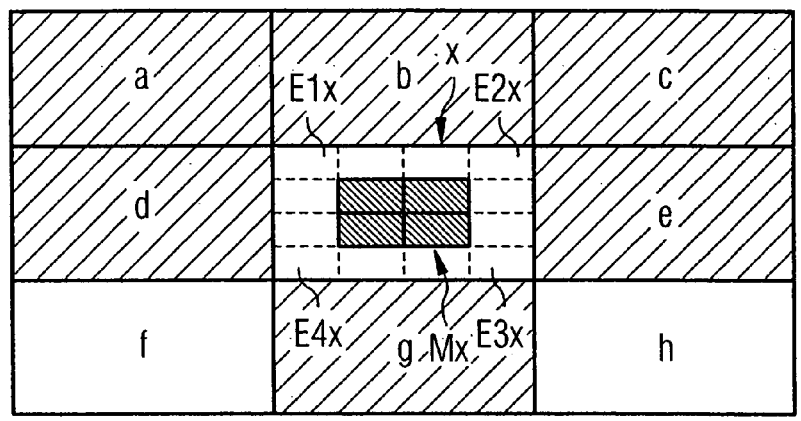
FIG. 3 illustrates the image section of FIGS. 1 and 2A-2C to explain the generation of a motion vector for a center region of the examined image block.

In the above example, the corner regions E1x, E2x, E3x, E4x are thus selected such that the corner regions of any adjacent corners of image block x adjoin each other, and such that the corner regions E1x, E2x, E3x, E4x together do not completely cover the image block x. With reference to FIG. 3, these corner regions E1x, E2x, E3x, E4x surround a center region Mx of the image block x, which region is formed by the four pixels x5, x6, x9, x10 located in the center of the image block x.

When using a block estimation method to determine the motion vectors assigned to the individual image blocks, estimation errors can occur, as a result of which the situation may arise in which a motion vector is assigned to the image block x different from that assigned to the image blocks a-h adjacent to this image block x. In order to eliminate such errors during the block estimation, for the center region Mx a motion vector Vmx is formed from the motion vectors of the adjacent image blocks whenever it is determined that the motion vectors of these image blocks a-h adjacent to the image block x form a homogeneous vector field. Preferably, at least five of image blocks a-h adjacent to image block x are examined. If it is determined that the motion vectors of these examined adjacent image blocks form a homogeneous vector field, the motion vector Vmx of the center region Mx is formed from the motion vectors of these examined adjacent image blocks by using one of the above methods, for example, by an averaging method.

The corner regions E1x, E2x, E3x, E4x and the center region Mx are preferably matched in such a way that they together completely fill out the image block x, preferably without any mutual overlap.

The method described above for the image block x is preferably implemented for all the image blocks of the image P. For example, if one examines the image block a, the motion vectors, for example, of the image blocks b, x, d adjacent to this corner region E3a are utilized to determine a motion vector for a lower right corner region E3a of this image block. Analogously, to determine a motion vector for a lower left corner region E4b of the image block b, motion vectors of the image blocks a, d, x adjacent to this corner region E4b are utilized.

In the example based on FIGS. 1-3, the individual image blocks each comprise 4×4 pixels, and the corner regions are selected such that they comprise three of the total of sixteen pixels.

It should be pointed out that the geometry of these corner regions can be chosen randomly such that all corner regions of an examined image block preferably, but not completely, fill out this image block. With reference to the above example, it is possible to select the corner regions such that these each comprise only one individual pixel, specifically, the pixels x0, x3, x12, x15 located in the corners.

If the individual image blocks comprise more than 4×4 pixels, it is of course also possible to select the corner regions such that they comprise more than one or three pixels.

Figure 5:
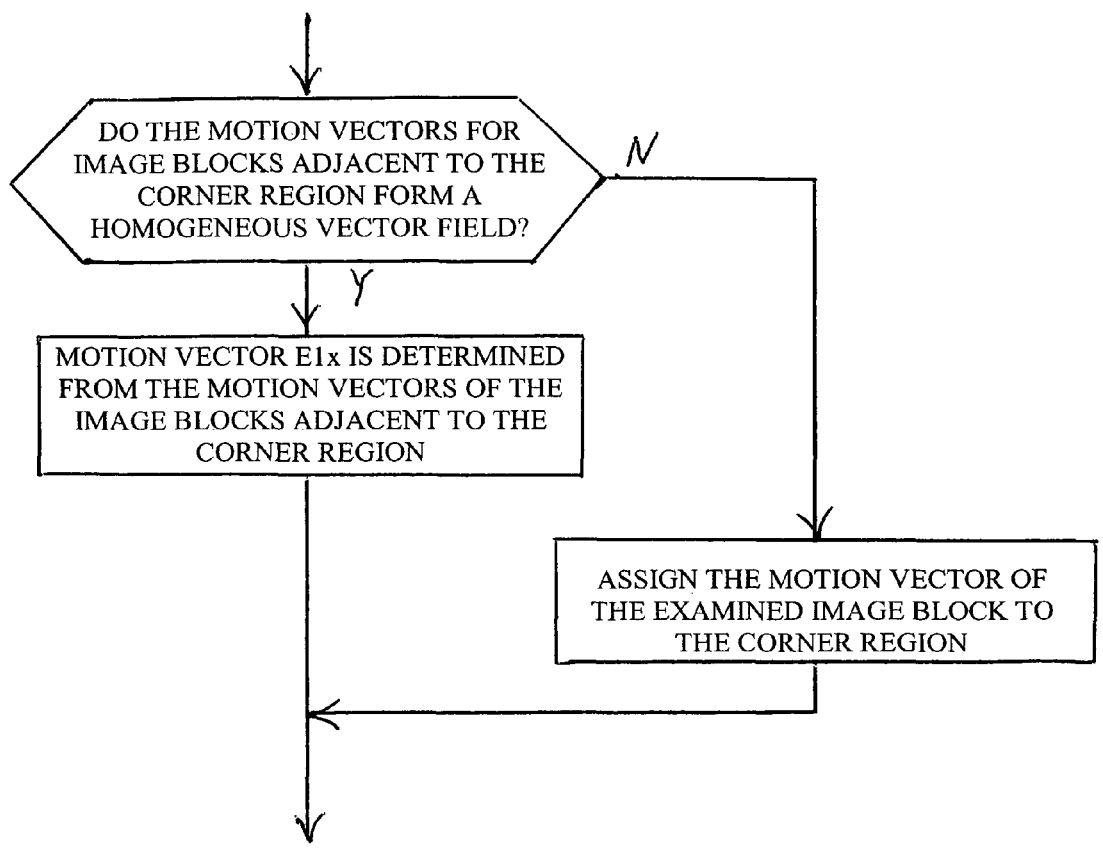
FIG. 5 is a flow chart illustration of image processing steps.

FIG. 5 is a flow chart illustration of image processing steps according to an aspect of the invention.

Figure 4:
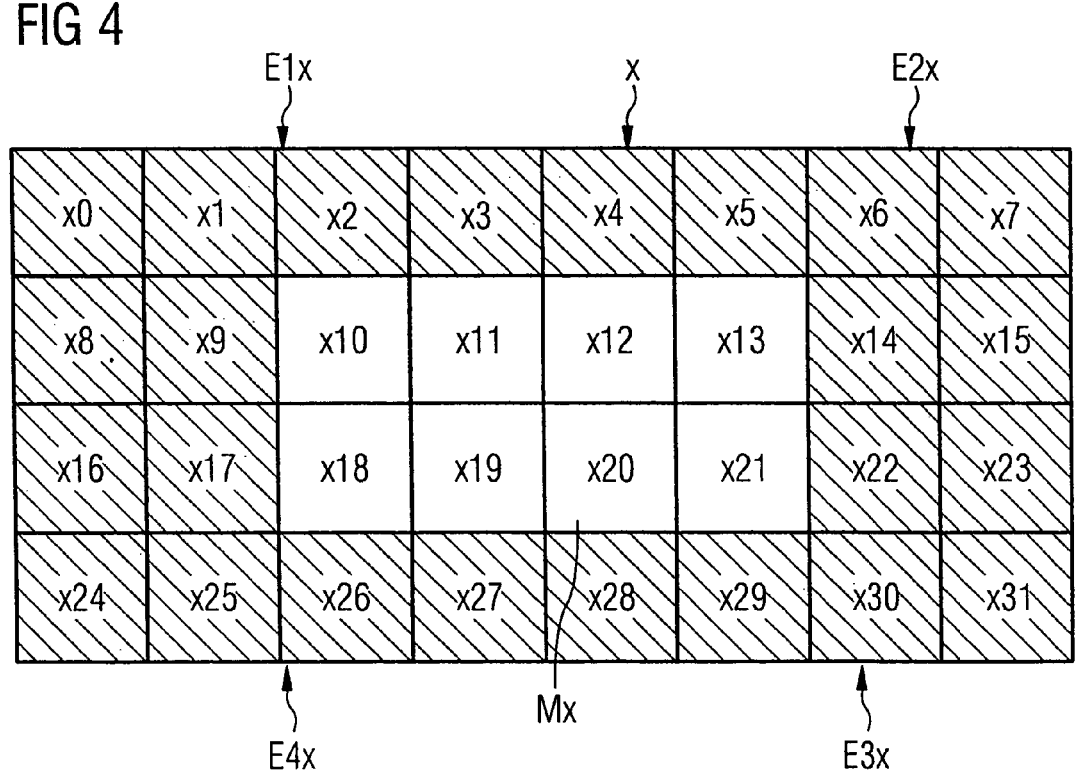
FIG. 4 illustrates a possible subdivision of an image block comprising 4×8 pixels.

Reference is made in this regard to FIG. 4 in which an image block x is shown schematically which comprises 32 pixels arranged in a 4×8 matrix with four pixel lines of eight pixels each. For illustrative purposes, these pixels are consecutively numbered line-by-line from left to right, beginning with the uppermost pixel line, from x0 through x31.

In these image blocks, corner regions E1x, E2x, E3x, E4x are selected such that they comprise six pixels each. The first corner region E1x in the upper left corner comprises pixels x0-x3 and x8, x9; the second corner region E2x in the upper right corner comprises pixels x4-x7 and x14, x15; the corner region E3x in the lower right corner comprises pixels x22, x23 and x28-x31; and the fourth corner region E4x in the lower left corner comprises pixels x16, x17 and x24-x27.

A center region Mx surrounded by these corner regions E1x-E4x comprises pixels x10-x13 and x18-x21.

Although the present invention has been shown and described with respect to several preferred embodiments thereof, various changes, omissions and additions to the form and detail thereof, may be made therein, without departing from the spirit and scope of the invention.

What is claimed is:

1. A method of determining motion vectors which are assigned to individual image regions of an image, wherein the image is subdivided into a number of rectangular image blocks, and a motion vector is assigned to each block of the number of rectangular image blocks, the method comprising:
    defining, using a first image processing unit, a corner region located in a corner of a selected one of the number of rectangular image blocks;
    determining, using a second image processing unit, a set of image blocks adjacent to the corner region;
    determining, using a third image processing unit, whether the motion vectors assigned to the set of image blocks adjacent to the corner region form a homogeneous vector field, and in response to a determination that the motion vectors assigned to the set of image blocks adjacent to the corner region form a homogeneous vector field, generating, using a fourth image processing unit, a motion vector for the corner region from the motion vectors of the set of image blocks adjacent to the corner.

2. The method of claim 1, comprising:
    defining the motion vector of the selected one of the image blocks as the motion vector for the corner region whenever the motion vectors of the adjacent image blocks do not form the homogeneous vector field.

3. The method of claim 1, where generating the motion vector for the corner region comprises averaging the motion vectors of the set of image blocks adjacent to the corner region.

4. The method of claim 3, in which the motion vectors of the adjacent image blocks are weighted equally during averaging.

5. The method of claim 3, in which the motion vector of one of the adjacent image blocks which is adjacent at only one corner to the corner region is given a higher weight during averaging than the motion vectors of the other image blocks adjacent to the corner region.

6. The method of claim 5, in which the corner region comprises a corner pixel located in the corner of the selected image block.

7. The method of claim 6, in which starting from the corner pixel the corner region comprises at least a first one pixel located in the horizontal direction of the selected image block adjacent to the corner pixel, and at least a second one pixel located in the vertical direction of the selected image block adjacent to the corner pixel.

8. The method of claim 5, comprising:
    defining, using a fifth image processing unit, a center region located in the center of the selected image block;
    determining, using a sixth image processing unit, whether the motion vectors of at least five of the number of rectangular image blocks adjacent to the selected image block form a second homogeneous vector field; and
    generating, using a seventh image processing unit, a motion vector for the center region from the motion vectors of the at least five adjacent image blocks whenever the motion vectors of these at least five adjacent image blocks form the second homogeneous vector field.

9. The method of claim 1, where the presence of the second homogeneous vector field is determined when absolute values of difference vectors, which are formed from vector differences of the motion vectors of the adjacent image blocks, are smaller than a predetermined threshold value.

10. The method of claim 1, where image blocks comprise four pixels horizontally and four pixels vertically.

11. An apparatus for determining motion vectors which are assigned to individual image regions of an image, wherein the image is subdivided into a number of rectangular image blocks, and a motion vector is assigned to each image block, comprising:
    a unit that selects a corner region located in a corner of a selected one of the image blocks;
    a unit that determines the image blocks adjacent to the corner region;
    a unit that determines whether the motion vectors assigned to the image blocks adjacent to the corner region form a homogeneous vector field; and
    a unit that generates a motion vector for the corner region from the motion vectors of the selected adjacent image blocks in response to a determination that the motion vectors of the adjacent image blocks form the homogeneous vector field.

12. A method of processing an image that includes a plurality of image blocks each including a plurality of pixels and having an associated motion vector, the method comprising:
    selecting, using an image processing unit, an image block and a corner region located in a corner of the selected image block to provide a selected corner region;
    determining, using the unit, a plurality of adjacent image blocks located adjacent to the selected corner region from the plurality of image blocks;
    determining, using the unit, whether the motion vectors assigned to the adjacent image blocks form a homogeneous vector field; and
    generating, using the unit, a motion vector for the corner region from the motion vectors of the adjacent image blocks in response to a determination that the motion vectors of the adjacent image blocks form a homogeneous vector field.

13. The method of claim 12, where generating the motion vector for the selected corner region comprises averaging the motion vectors of the adjacent image blocks.

14. The method of claim 13, where generating the motion vector for the selected corner region comprises applying a weighted averaging of the motion vectors of the adjacent image blocks.

* * * * *